United States Patent Office 2,910,276
Patented Oct. 27, 1959

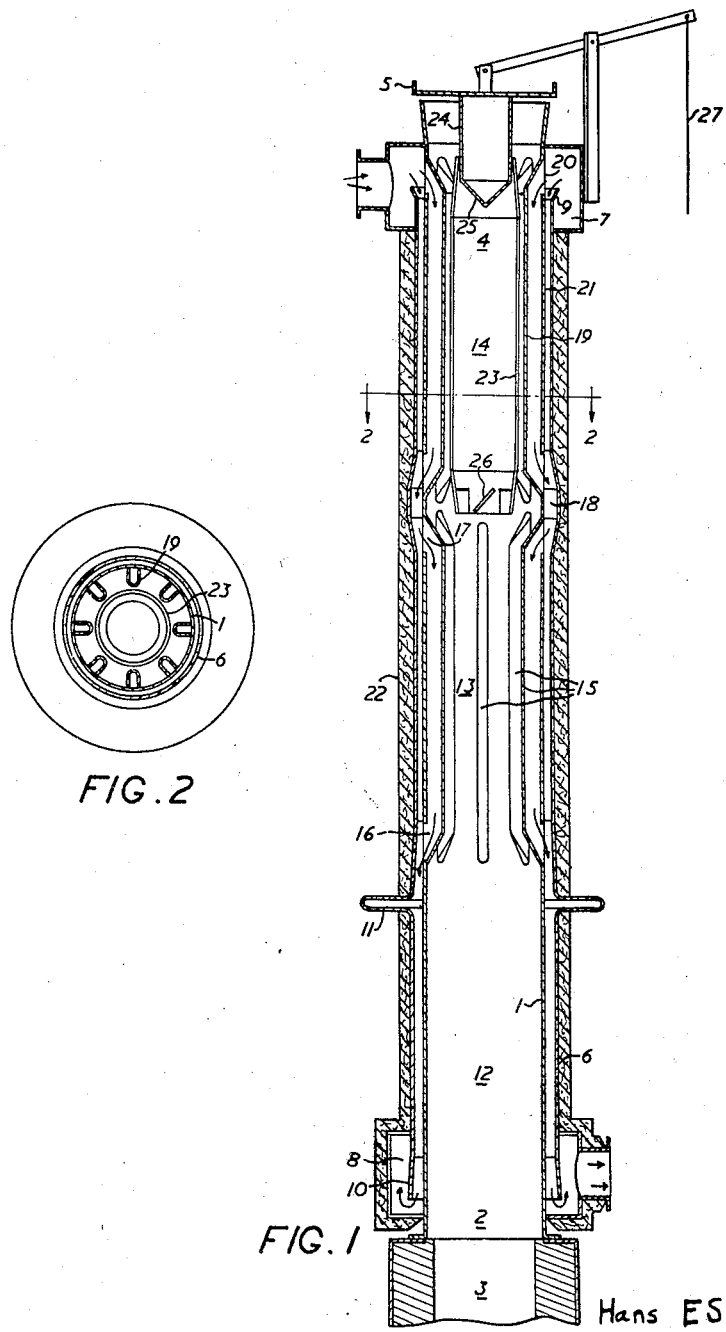

2,910,276

RECUPERATORS

Hans Escher, Turramurra, New South Wales, Australia

Application February 25, 1958, Serial No. 717,450

Claims priority, application Australia April 12, 1957

12 Claims. (Cl. 257—169)

This invention relates to combustion furnace recuperators for heating air or other gases or gas mixtures by heat exchange between the gas to be heated and the products of combustion exhausting from the furnace. The invention is particularly useful in connection with high temperature furnaces such as those used for the melting of metal, and for glass, iron, and steel manufacturing purposes.

An object of this invention is to provide a recuperator which makes efficient use of heat transfer by radiation in the high temperature zone and by convection in the low temperature zone, while providing a substantially unobstructed passage for the flue gases. A further object of the invention is to provide a recuperator with means, in the low temperature zone, and linked with the main outlet valve whereby the flue gases are directed into close contact with the recuperator wall as the main outlet valve is moved toward the closed position.

According to this invention a combustion furnace recuperator comprises a conduit, an entrance end to said conduit adapted to receive flue gases exhausting from the flue gas outlet of a furnace, an outlet end to said conduit communicating with the atmosphere or an exhaust system, a shell which closely surrounds said conduit and therewith forms a gas heating passage, a gas inlet box which surrounds one end of said passage, a gas outlet box which surrounds the other end of said passage, the boxes having inlet and outlet branches respectively, and a plurality of hollow fins extending into an integral with the conduit, each hollow fin communicating at its ends with the annular gas heating passage.

Also according to this invention a combustion furnace recuperator comprises a conduit, an entrance end to said conduit adapted to receive flue gases exhausting from the flue gas outlet of a furnace, an outlet end to said conduit communicating with the atmosphere or an exhaust system, a shell which closely surrounds said conduit and therewith forms a gas heating passage, a gas inlet box which surrounds one end of said passage, a gas outlet box which surrounds the other end of said passage, the boxes having inlet and outlet branches respectively, a guide tube located inside the conduit and forming with it an annular passage whereby the flue gas is divided into two streams, one passing through the guide tube and the other through the annular passage between the guide tube and the conduit, a main outlet valve for the conduit, and a valve for the outlet end of the guide tube linked with and operable with the main outlet valve.

Reference will now be made to the accompanying drawings in which:

Figure 1 is a vertical section through a recuperator which is exemplary of the invention, and Figure 2 is a section on the line 2—2 of Figure 1.

The recuperator shown in the drawings is vertically disposed and comprises a large conduit 1 of which the entrance end 2 is adapted to receive hot flue-gas from the flue-gas outlet 3 of a furnace and the other or upper end 4 is in direct communication with the atmosphere by way of a movable valve cover 5. This conduit is closely surrounded by a shell 6 forming with the conduit 1 a gas heating passage through which the air or gases to be heated are forced. The shell extends for substantially the full length of the conduit.

The shell is surrounded at its upper end by a gas inlet box 7 and at its lower end by a gas outlet box 8. The ends of the shell, where they project into the boxes, may be flared outwardly at 9, 10. An expansion joint 11 may be provided at some point along the length of the shell.

The conduit is divided in effect into three zones which comprise a lower unrestricted radiation zone 12, an intermediate zone 13, and an upper zone 14. The intermediate zone is provided with a plurality of hollow fins 15, which extend into the interior of the conduit and are integral with it. The lower ends of each fin communicate, as by slots 16, with the gas heating passage, while the upper ends communicate with the gas heating passage by slots 17 at a mixing chamber 18; the outer shell is preferably of somewhat greater diameter at the mixing chamber. The upper zone 14 is likewise provided with hollow fins 19 similar to those provided in the intermediate zone, the lower ends of which also communicate with the said mixing chamber 18. The upper ends of the fins in the upper zone open by way of slots 20 in the conduit into the gas inlet box 7 at the top of the recuperator. Thus a proportion of the air or gas to be heated flows through the annular gas heating passage 21 and another portion flows in parallel through the said fins 19 and 15. The whole assembly is covered by heat insulation 22.

The rate of heat transfer may be increased by providing a guide 23 inside the conduit and extending over the length of the upper zone. The diameter of this guide tube is slightly less than the distance between adjacent edges of diametrally disposed fins 19, and it may be flared inwardly at its upper and lower ends. The upper end of the guide tube may be closed by a valve having a cylindrical portion 24 which is a close fit inside the mouth of the guide tube and a conical portion 25 below the cylindrical portion. The upper end of the cylindrical portion is attached to the movable main outlet cover-plate or valve 5 so that the two valves are operated together.

At partial load when the flue gases are comparatively cool they may be brought into more effective heat exchange relation with the fins in the upper zone by closing the valve for the guide tube, so that the flue gases are forced at high velocity through the spaces between the guide tube, fins and conduit: Under conditions of maximum flow this valve is opened along with the main outlet valve providing additional area for the flue gases in the upper zone. Whirler vanes 26 may be provided at the inlet to the guide tube to give the gases a rotary motion and thus increase heat transfer to the guide tube, which transmits heat to the fins and inner shell by radiation.

The valves 5, 24 may be operated manually by the line 27 or automatically according to the temperature of the flue gases. It will be appreciated that the division of the recuperator, for the purposes of description, into three zones of which one is called the radiation zone does not mean that heat transfer by radiation occurs only in that zone. In fact heat transfer by radiation may occur in any one of the zones, but becomes markedly less efficient as the gases cool, as they pass from the lower zone to the intermediate and upper zones, and in the latter two zones heat transfer is primarily effected by convection.

As practically no friction loss is incurred in transferring heat from the flue gases to the heating surfaces in the radiation zone, a large proportion of the stack draft created by the buoyancy of the flue gases is available for frictional losses in the upper convection section.

What I claim is:

1. A combustion furnace recuperator comprising a conduit, an entrance end to said conduit adapted to receive flue gases exhausting from the flue gas outlet of a furnace, an outlet end to said conduit, a shell which closely surrounds said conduit and therewith forms a gas heating passage, a gas inlet box which surrounds one end of said passage, a gas outlet box which surrounds the other end of said passage, the boxes having inlet and outlet branches respectively, a plurality of hollow fins extending into and integral with the conduit, each hollow fin communicating at its ends with the annular gas heating passage, a guide tube located inside the conduit and with it forming an annular passage whereby the flue gas is divided into a stream passing through the guide tube and a stream passing through the annular passage between the guide tube and the conduit and through the channels in the annular passage formed by said hollow fins, a main outlet valve for the conduit, and a valve for the outlet end of the guide tube linked with and operable with the main outlet valve.

2. A combustion furnace recuperator comprising a conduit having a cylindrical wall, an entrance end to said conduit adapted to receive flue gases exhausting from the flue gas outlet of a furnace, an outlet end to said conduit, a shell which closely surrounds said cylindrical wall of the conduit and therewith forms a gas heating passage, a gas inlet box which surrounds one end of said passage, a gas outlet box which surrounds the other end of said passage, the boxes having inlet and outlet branches respectively, and a plurality of hollow fins extending into and integral with the conduit and having one wall thereof constituted by parts of the cylindrical conduit, each hollow fin communicating at its ends with the annular gas passage.

3. A combustion furnace recuperator comprising a conduit, an entrance end to said conduit adapted to receive flue gases exhausting from the flue gas outlet of a furnace, an outlet end to said conduit, a shell which closely surrounds said conduit and therewith forms a gas heating passage, a gas inlet box which surrounds one end of said passage, a gas outlet box which surrounds the other end of said passage, the boxes having inlet and outlet branches respectively, a guide tube located inside the conduit and forming with it an annular passage whereby the flue gas is divided into two streams, one passing through the guide tube and the other through the annular passage between the guide tube and the conduit, a main outlet valve for the conduit, and a valve for the outlet end of the guide tube linked with and operable with the main outlet valve.

4. A combustion furnace recuperator comprising a conduit having a cylindrical wall, an entrance end to said conduit adapted to receive flue gases exhausting from the flue gas outlet of a furnace, an outlet end to said conduit, a shell which closely surrounds said cylindrical wall of the conduit and therewith forms a gas heating passage, a gas inlet box which surrounds one end of said passage, a gas outlet box which surrounds the other end of said passage, the boxes having inlet and outlet branches respectively, an unobstructed radiation zone in the conduit extending from the inlet end or plane to an intermediate plane, and a plurality of hollow tubular longitudinal fins extending into the conduit in the portion from the said intermediate plane to the said outlet end and having one wall thereof constituted by parts of the cylindrical wall of the conduit, each hollow fin communicating at its ends with the annular gas heating passage.

5. A combustion furnace recuperator comprising a conduit having a cylindrical wall, an entrance end to said conduit adapted to receive flue gases exhausting from the flue gas outlet of a furnace, an outlet end to said conduit, a shell which closely surrounds said cylindrical wall of the conduit and therewith forms a gas heating passage, a gas inlet box which surrounds one end of said passage, a gas outlet box which surrounds the other end of said passage, the boxes having inlet and outlet branches respectively, an unobstructed radiation zone in the conduit extending from the inlet end or plane to a first intermediate plane, a first plurality of hollow tubular longitudinal fins extending into the conduit in the portion from the said first intermediate plane to a second intermediate plane between the first intermediate plane and the said outlet end, each hollow fin communicating at its ends with the annular gas heating passage, and a second plurality of hollow tubular longitudinal fins extending into the conduit in the portion from the said second intermediate plane to the outlet end, each hollow fin communicating at its ends with the annular gas heating passage, and adjacent ends of the two sets of longitudinal fins opening into a mixing chamber, each said hollow fin having one wall thereof constituted by parts of the cylindrical wall of the conduit.

6. A combustion furnace recuperator comprising a conduit, an entrance end to said conduit adapted to receive flue gases exhausting from the flue gas outlet of a furnace, an outlet end to said conduit, a shell which closely surrounds said conduit and therewith forms a gas heating passage, a gas inlet box which surrounds one end of said passage, a gas outlet box which surrounds the other end of said passage, the boxes having inlet and outlet branches respectively, an unobstructed radiation zone in the conduit extending from the inlet end or plane to an intermediate plane, a plurality of hollow longitudinal fins extending into the conduit in the portion from the said intermediate plane to the said outlet end, each hollow fin communicating at its ends with the annular gas heating passage, and including at the outlet end of the conduit a guide tube located inside the conduit said guide tube having a diameter slightly less han the distance between adjacent edges of diametrally disposed fins, a main outlet valve for the conduit, and a valve for the outlet end of the guide tube linked and operable with the main outlet valve.

7. A combustion furnace recuperator as claimed in claim 6 wherein the hollow longitudinal fins at the outlet end of the conduit open into the gas inlet box.

8. A combustion furnace recuperator as claimed in claim 6 wherein the said valve for the guide tube comprises a cylindrical portion which fits closely inside the outlet end of the guide tube, and a conical portion at the lower end of the cylindrical portion.

9. A combustion furnace recuperator comprising a conduit, an entrance end to said conduit adapted to receive flue gases exhausting from the flue gas outlet of a furnace, an outlet end to said conduit, a shell which closely surrounds said conduit and therewith forms a gas heating passage, a gas inlet box which surrounds one end of said passage, a gas outlet box which surrounds the other end of said passage, the boxes having inlet and outlet branches respectively, an unobstructed radiation zone in the conduit extending from the inlet end or plane to a first intermediate plane, a first plurality of hollow longitudinal fins extending into the conduit in the portion from the said first intermediate plane to a second intermediate plane between the first intermediate plane and the said outlet end, each hollow fin communicating at its ends with the annular gas heating passage, a second plurality of hollow longitudinal fins extending into the conduit in the portion from the said second intermediate plane to the outlet end, each hollow fin communicating at its ends with the annular gas heating passage, and adjacent ends of the two sets of longitudinal fins opening into a mixing chamber, and a guide tube located inside the conduit at the outlet end thereof said guide tube having a diameter slightly less than the distance between adjacent edges of diametrally disposed fins of said second plurality of fins, a main outlet valve for the conduit, and a valve for the outlet end of the guide tube linked and operable with the main outlet valve.

10. A combustion furnace recuperator as claimed in claim 9 wherein the said valve for the guide tube comprises a cylindrical portion which fits closely inside the outlet end of the guide tube, and a conical portion at the lower end of the cylindrical portion.

11. A combustion furnace recuperator comprising a conduit, an entrance end to said conduit adapted to receive flue gases exhausting from the flue gas outlet of a furnace, an outlet end to said conduit, a shell which closely surrounds said conduit and therewith forms a gas heating passage, a gas inlet box which surrounds one end of said passage, a gas outlet box which surrounds the other end of said passage, the boxes having inlet and outlet branches respectively, a guide tube located inside the conduit and forming with it an annular passage whereby the flue gas is divided into two streams, one passing through the guide tube and the other through the annular passage between the guide tube and the conduit, a main outlet valve for the conduit, a valve for the outlet end of the guide tube comprising a cylindrical portion which fits closely inside the outlet end of the guide tube and a conical portion at the lower end of the cylindrical portion, said last-mentioned valve being connected with and operable with the main outlet valve.

12. A combustion furnace recuperator comprising a cylindrical conduit, an entrance end to said conduit adapted to receive flue gases exhausting from the flue gas outlet of a furnace, an outlet end to said conduit, a cylindrical shell which closely surrounds said conduit and therewith forms a gas heating passage, a plurality of tubular passages inside the conduit each having a cross-sectional area small compared with that of the conduit and each passage having a substantial part of its wall constituted by the conduit, and openings in the conduit by which the ends of the passages communicate with the gas heating passage.

References Cited in the file of this patent

UNITED STATES PATENTS 2,479,413  Ryan ------------------ Aug. 16, 1949

FOREIGN PATENTS 58,506  Switzerland ------------ Jan. 15, 1912